US00RE48068E

(19) United States
(12) Reissued Patent
Nojiri et al.

(10) Patent Number: US RE48,068 E
(45) Date of Reissued Patent: Jun. 30, 2020

(54) BRUSH CUTTER

(71) Applicant: MAKITA CORPORATION, Aichi (JP)

(72) Inventors: Hiroshi Nojiri, Aichi (JP); Yoshifumi Morita, Aichi (JP); Toshikazu Migita, Aichi (JP)

(73) Assignee: MAKITA CORPORATION, Aichi (JP)

(21) Appl. No.: 15/938,588

(22) Filed: Mar. 28, 2018

Related U.S. Patent Documents

Reissue of:
(64) Patent No.: 9,756,783
Issued: Sep. 12, 2017
Appl. No.: 14/764,627
PCT Filed: Jan. 31, 2014
PCT No.: PCT/JP2014/052271
§ 371 (c)(1),
(2) Date: Jul. 30, 2015
PCT Pub. No.: WO2014/119732
PCT Pub. Date: Aug. 7, 2014

(30) Foreign Application Priority Data

Feb. 1, 2013 (JP) ..... 2013-018667

(51) Int. Cl.
*A01D 34/81* (2006.01)
*A01D 34/90* (2006.01)

(52) U.S. Cl.
CPC ..... *A01D 34/81* (2013.01); *A01D 34/90* (2013.01); *A01D 34/902* (2013.01)

(58) Field of Classification Search
None
See application file for complete search history.

(56) References Cited

U.S. PATENT DOCUMENTS 5,028,858 A * 7/1991 Schnizler ..... B23B 45/02 320/136
5,589,288 A * 12/1996 Coulson ..... H01M 2/1055 30/500

(Continued)

FOREIGN PATENT DOCUMENTS

EP 1179291 2/2002
JP 10-56845 3/1998

(Continued)

OTHER PUBLICATIONS

Extended European Search Report issued in EP 14745485.4, dated Oct. 10, 2016.

(Continued)

*Primary Examiner* — Glenn K Dawson
(74) *Attorney, Agent, or Firm* — Greenblum & Bernstein, P.L.C.

(57) ABSTRACT

A brush cutter includes a frame rod, a front end housing fixedly mounted to a front end of the frame rod, a cutting blade mounted on a support shaft within the front end housing, a rear end housing fixedly mounted to a rear end of the frame rod, an electric motor mounted within the rear end housing for rotation of the cutting blade, and a source of power supply for supplying electric power to the motor. In the brush cutter, a plurality of rechargeable battery packs adapted to use in electric power tools are used as the source of power supply for the motor.

28 Claims, 19 Drawing Sheets

(56) References Cited

U.S. PATENT DOCUMENTS

| | | | | |
|---|---|---|---|---|
| 5,613,354 | A * | 3/1997 | Foster | A01D 34/001 56/12.7 |
| 6,729,413 | B2 * | 5/2004 | Turner | H01M 2/1022 173/217 |
| 7,739,800 | B2 * | 6/2010 | Hurley | A01D 34/905 172/14 |
| 8,549,758 | B2 * | 10/2013 | Ito | A01D 34/90 30/276 |
| 8,733,470 | B2 * | 5/2014 | Matthias | B25F 5/02 173/170 |
| 8,813,866 | B2 * | 8/2014 | Suzuki | B25F 5/00 173/2 |
| 8,984,711 | B2 * | 3/2015 | Ota | H01M 2/10 15/339 |
| 9,148,997 | B2 * | 10/2015 | Fukunaga | A01D 34/905 |
| 2011/0197389 | A1 | 8/2011 | Ota et al. | |
| 2011/0198103 | A1 * | 8/2011 | Suzuki | B25F 5/00 173/46 |
| 2011/0284257 | A1 * | 11/2011 | Ogino | B25F 5/00 173/217 |
| 2012/0256590 | A1 | 10/2012 | Hamano et al. | |
| 2012/0321912 | A1 | 12/2012 | Hachisuka et al. | |
| 2013/0164589 | A1 | 6/2013 | Ota et al. | |
| 2013/0276314 | A1 * | 10/2013 | Fukunaga | A01D 34/905 30/276 |
| 2014/0208599 | A1 * | 7/2014 | Nagahama | A01D 34/6806 30/277.4 |
| 2018/0304454 | A1 * | 10/2018 | Kawakami | B25F 5/02 |

FOREIGN PATENT DOCUMENTS

| | | | | |
|---|---|---|---|---|
| JP | 2001-351592 | | 12/2001 | |
| JP | 2008-835 | | 1/2008 | |
| JP | 2010-41942 | | 2/2010 | |
| JP | 2011-97837 | | 5/2011 | |
| JP | 2011-142859 | | 7/2011 | |
| JP | 2011161602 | * | 8/2011 | B25F 5/00 |
| JP | 2012-221780 | | 11/2012 | |
| KR | 10-2005-0042716 | | 5/2005 | |
| WO | WO-2014119108 | A1 * | 8/2014 | H01M 2/1022 |

OTHER PUBLICATIONS

European Office Action issued in EP 14745485.4, dated Jan. 29, 2019.

International Search Report for PCT/JP2014/052271 dated Apr. 28, 2014, along with English-language translation thereof.

* cited by examiner

Fig. 19 ( a )
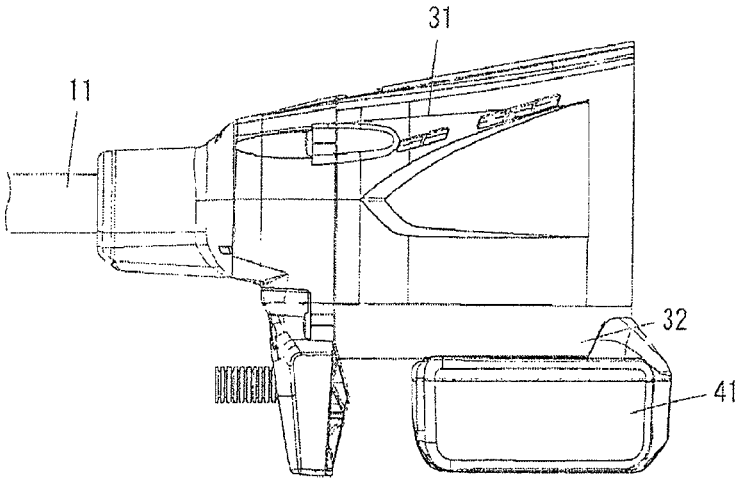
Fig. 19 ( b )
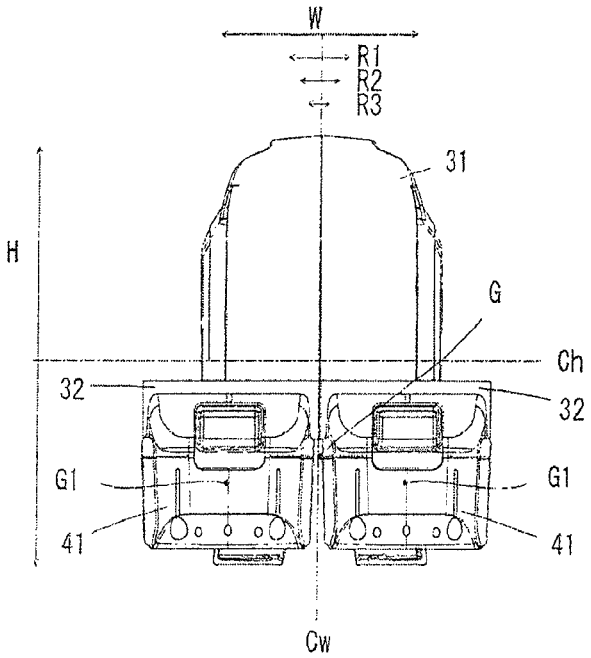

Fig. 23( a )
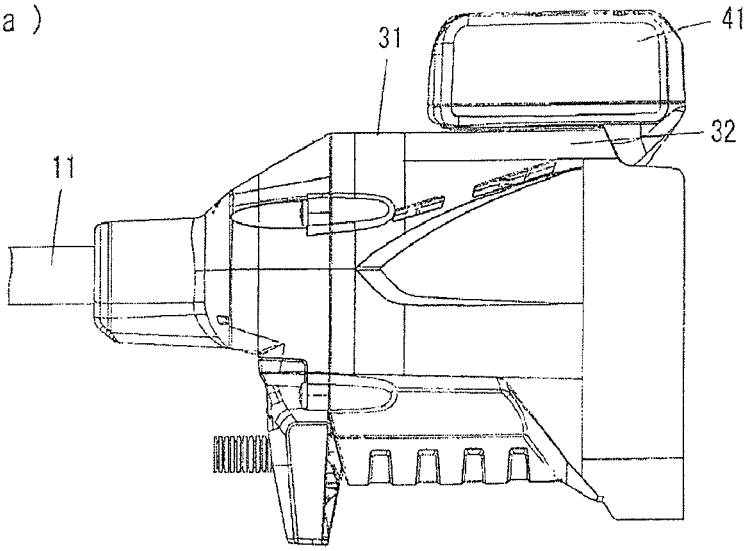
Fig. 23( b )
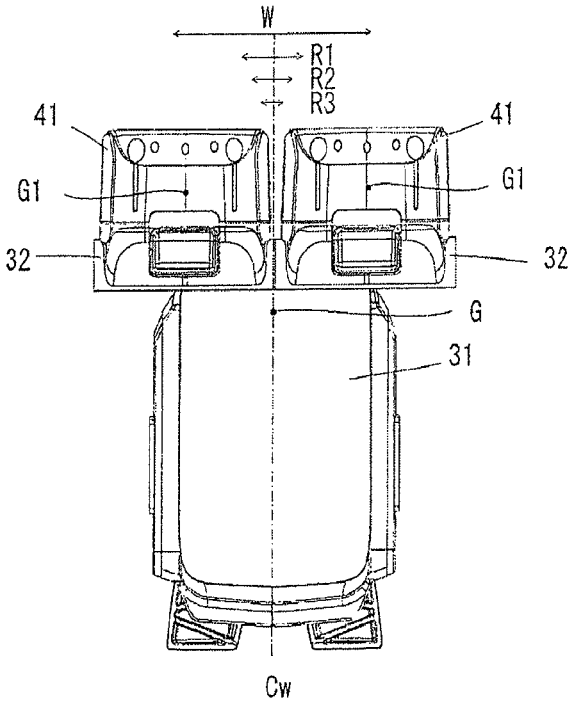

Fig. 27 ( a )
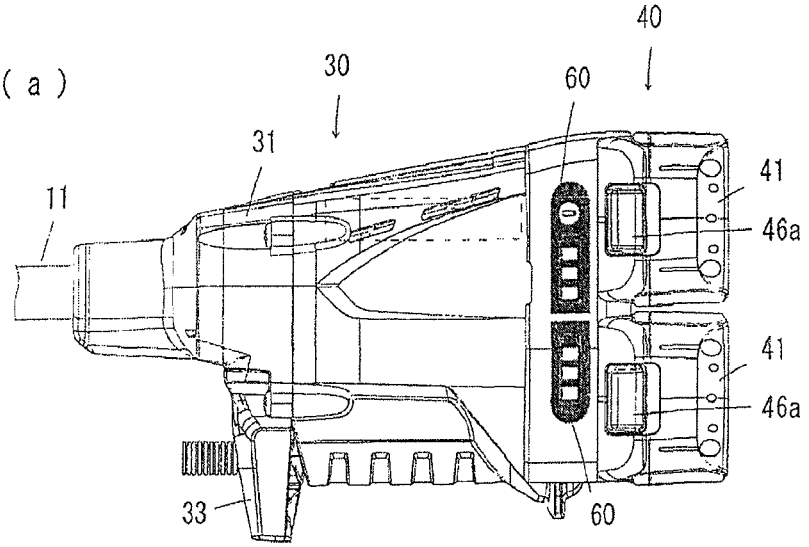
Fig. 27 ( b )
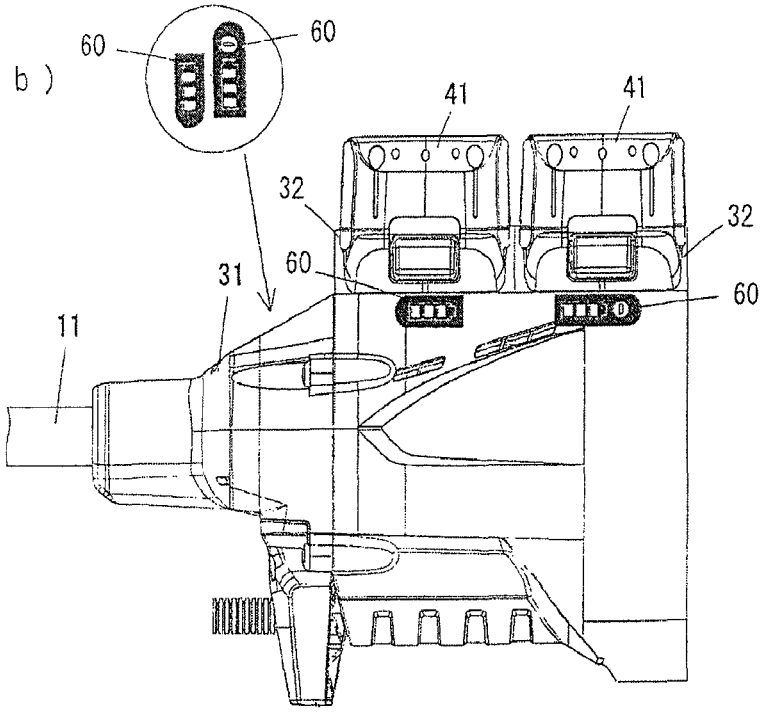

BRUSH CUTTER

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

TECHNICAL FIELD

The present invention relates to a brush cutter for cutting brush, lawn and the like.

TECHNICAL BACKGROUND

Disclosed in Japanese Patent Laid-open Publication 1 (2011-142859) is a brush cutter comprising a frame rod, a cutter head provided within a front end of the frame rod and a controller head provided in a rear end of the frame rod. The cutter head of the brush cutter includes a front housing fixed to the front end of the frame rod, an electric motor mounted within the front housing, a rotary shaft supported within the front housing to be driven by the electric motor, and a cutting blade mounted to the rotary shaft. The controller head includes a rear housing fixed to the rear end of the frame rod and a controller contained in the rear housing. In the brush cutter, a battery pack is detachably mounted within the rear housing.

In the brush cutter, a single battery pack contained within the rear housing is in general in the form of a large size battery pack of high voltage (for instance, 36 volt) for activating the electric motor of high power. Such a large size battery pack of high voltage may not be used as a source of power supply for other work apparatus such as electric power tools. For this reason, the large size battery pack is adapted for use only in the brush cutter in spite of expensive. An object of the present invention is to provide a brush cutter without use of the expensive large size battery.

SUMMARY OF THE INVENTION

According to the present invention, the object is accomplished by providing a brash cutter which comprises a frame rod, a front housing fixed to the front end of the frame rod, a cutting blade mounted on a rotary shaft supported within the front housing, a rear housing fixed to the rear end of the frame rod, an electric motor mounted within the front housing for rotating the cutting blade, and a source of power supply for the motor, wherein the source of power supply is in the form of a plurality of rechargeable battery packs adapted to use in electric power tools. In the brush cutter, the rechargeable battery packs for use in electric power tools can be used in common as a source of power supply for the motor.

In the brush cutter, it is preferable that the battery packs are arranged in such a manner that the center of gravity of the brush cutter observed from the rear side in a condition where the frame rod was placed on a horizontal support place is positioned in an extent of 15%, preferably 10%, more preferably 5% of width of the rear housing at both the left and right sides of a centerline extending vertically from the rear housing. With such arrangement of the battery packs, it is able to prevent lateral inclination of the vegetation cutter.

In the brush cutter, it is preferable that the center of gravity of the vegetation cutter observed from the rear side is displaced laterally from the vertical centerline in the extent described above. With such arrangement of the center of gravity, the brush cutter is slightly inclined in a lateral direction to adjust operability of the brush cutter. It is also preferable that each center of gravity of the battery packs is positioned in the extent described above. It is further preferable that the center of gravity of the brush cutter observed from the rear side in a condition where the frame rod was placed on a horizontal support place is positioned below a vertical centerline extending in a left and right direction.

In the case that each center of gravity of a set of two battery packs is positioned at both left and right sides of the centerline, the balance of the brush cutter in the lateral direction is adjusted to prevent the brush cutter from lateral inclination in operation.

In the brush cutter, it is preferable that the battery packs are spaced from ground to avoid damage caused by contact with the ground in a condition where the frame rod was placed on a horizontal support place. Desirably, a protector member is provided to cover the battery packs brought into contact with the ground when the frame rod is placed on a horizontal support place. The protector member is useful to avoid damage caused by contact with the ground.

In the brush cutter, it is preferable that the battery packs are arranged in parallel to facilitate operation of a user for attachment or removal of the battery packs. In the case that the battery packs are arranged in parallel with a space more than 15 mm, each battery pack can be easily grasped for attachment or removal of the battery pack. In the case that the size of each battery pack is more than 200 $cm^3$, the space between the battery packs arranged in parallel is determined to be 15 mm for reducing the space occupied by the battery packs.

In the brush cutter, it is preferable that a plurality of attachments is provided for mounting the battery packs. The battery packs each includes a casing formed to contain battery cells therein, an electric connector provided on one-side wall of the casing, and a pair of rails arranged on opposite sides of the electric connector. The attachment is provided with a pair of guide rails for engagement with the rails of the connector. The rails of the connector are slideably engaged with the guide rails of the attachment. The battery pack has a hook retractably projected, while the attachment is provided with a latchet to be engaged with the hook. When the hook of the battery pack is brought into engagement with the latchet of the attachment, the battery pack is fixed in place to the attachment. In the case that the attachment is provided with a resilient member for biasing the battery pack in a removal direction along the guide rails, the battery pack is removed from the attachment under biasing force of the resilient member when the hook is disengaged from the retainer.

BRIEF DESCRIPTION OF THE DRAWINGS

FIG. 19 (a) is a side-view of a controller unit shown in the modification 9, and FIG. 19 (b) is a back view of the controller unit;

FIG. 23 (a) is a side view of a controller unit in the modification 13, and FIG. 23 (b) is a back-view of the controller;

FIGS. 27 (a) and 27 (b) are a side view of a controller unit wherein a remaining power of a battery pack is shown on an indication panel.

PREFERRED EMBODIMENT OF THE INVENTION

Hereinafter, a preferred embodiment of a brush cutter in accordance with the present invention will be described with reference to the accompanying drawings. As show in FIGS. 1 and 2, the brush cutter 10 includes a hollow frame rod 11 extending in a fore-and-aft direction, a cutter unit 20 assembled with a front end of the frame rod 11, and a controller unit 30 assembled on a rear end of the frame rod 11.

Figure 1:
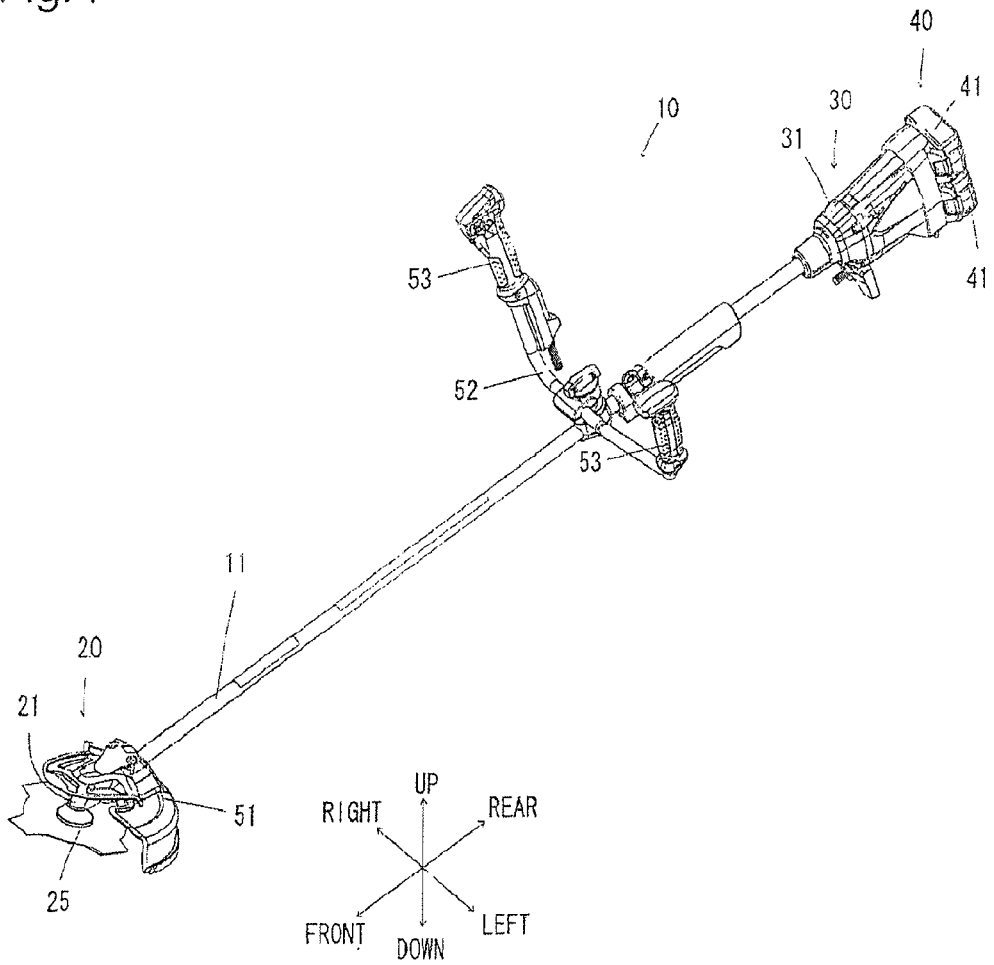
FIG. 1 is a perspective view of a brush cutter in an embodiment of the present invention.
Figure 2:
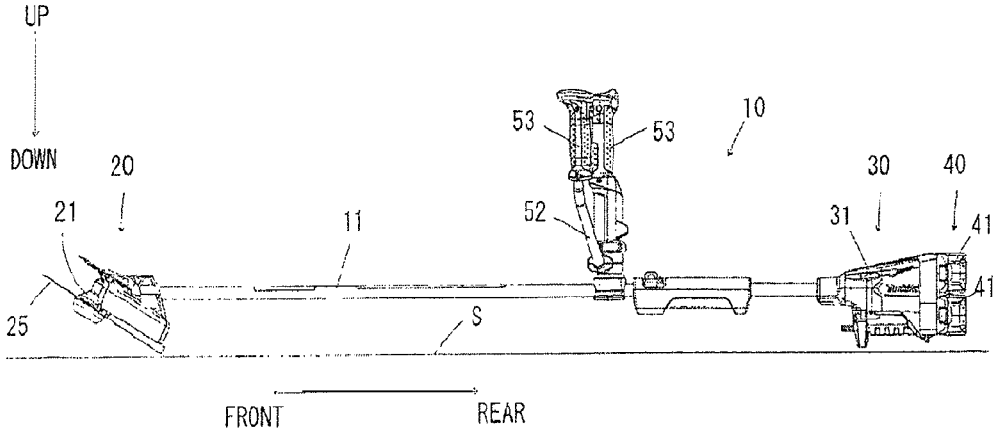
FIG. 2 is a side view of the brush cutter shown in FIG. 1 in a condition where the brush cutter is placed on a support surface.
Figure 3:
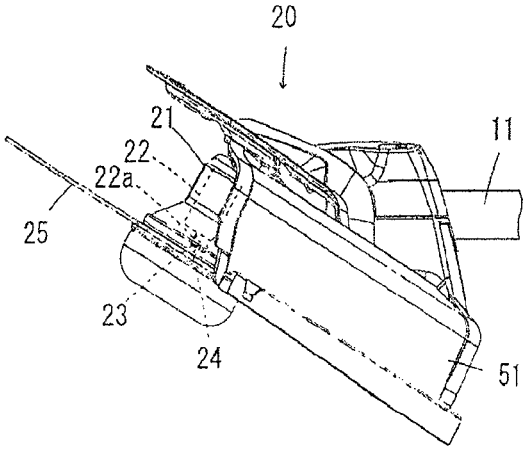
FIG. 3 is a side view of a cutter head.

As shown in FIGS. 1~3, the cutter unit 20 is provided within a front end housing 21 fixed to the front end of frame rod 11. As shown in FIG. 3, an electric motor 22 is mounted within the front end housing 21, and an output shaft 22a of motor 20 is engaged with a speed reduction gear 23. The speed reduction gear 23 is fixed to a rotary shaft 24 supported by bearings, and a rotary cutter 25 is fixed to the distal end of rotary shaft 24.

Figure 4:
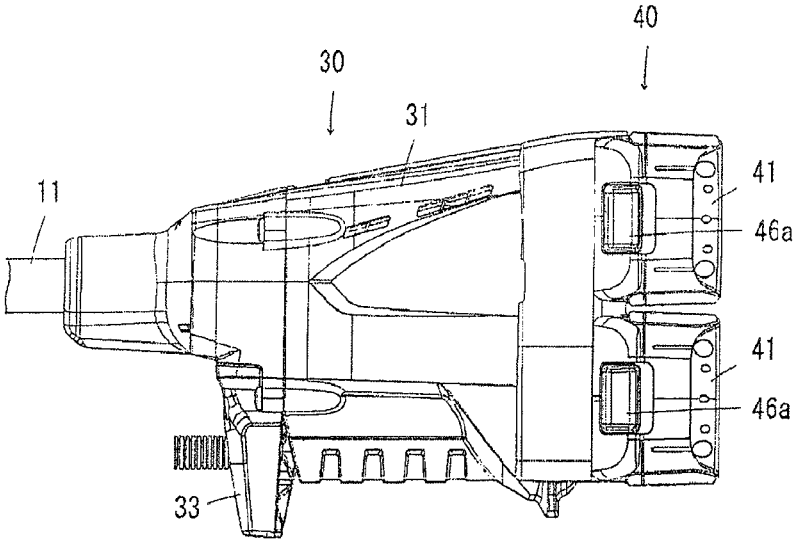
FIG. 4 is a side view of a controller unit.

As shown in FIGS. 1, 2 and 4, the controller unit 30 is mainly composed of a rear end housing 31 and a motor controller (not shown) for controlling operation of the electric motor 22. The rear end housing 31 is in the form of a quadrangular-pyramid narrow at its front side and is fixedly connected to the rear end of frame rod 11. As shown in FIGS. 1, 2, 4 and 6, a source of power supply is detachably mounted within a rear portion of the rear end housing 31 for supplying electric power to the motor 22. The source of power supply 40 is in the form of two battery packs 41 arranged vertically in parallel.

Figure 5:
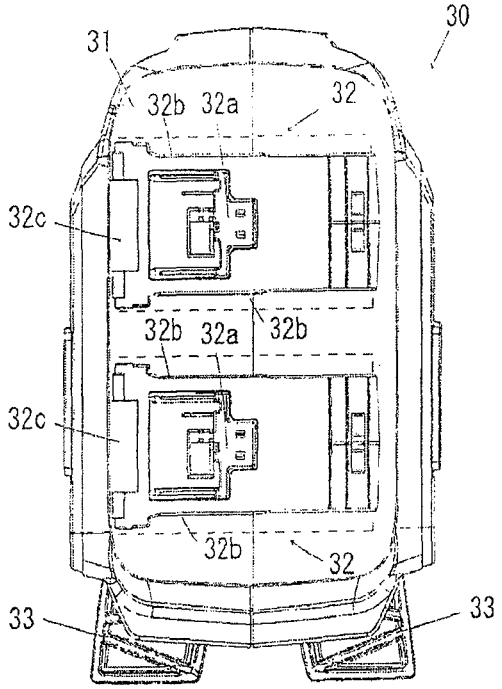
FIG. 5 is a back view of a rear-end housing in a condition where battery packs was removed.
Figure 6:
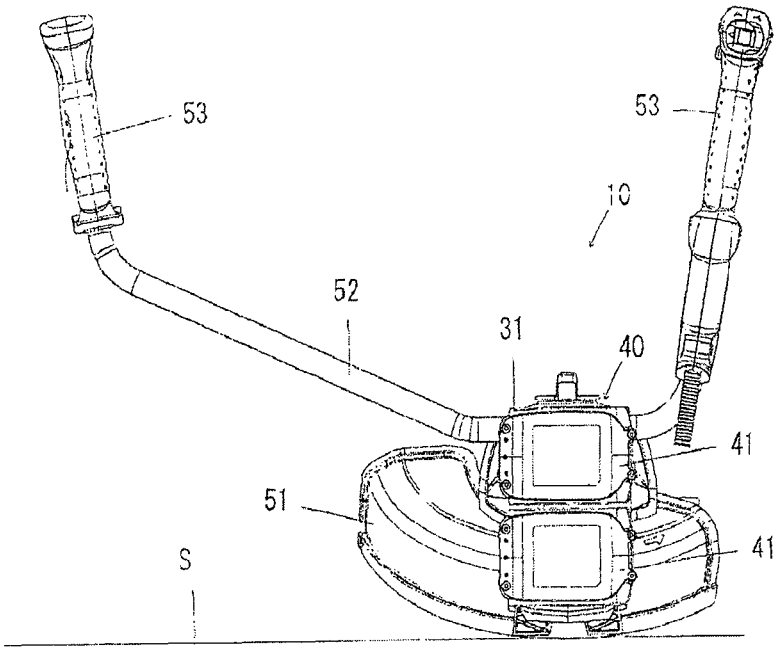
FIG. 6 is a back view of the brush cutter shown in FIG. 1, in a condition where the frame rod is placed on a support surface.

FIG. 5 is a back view of the rear end housing 31 in a condition where the battery packs 41 were removed. The rear end housing 31 is provided at its rear portion with attachments 32, 32 for the two battery packs 41, 41. The attachments 32 each are provided with a connector 32a to be connected to a connector 44 of battery pack 41 for connection to the electric motor 22. The connector 32a is provided with a pair of vertically spaced guide rails 32b, 32b for mounting the battery pack 41 slideable in left-and-right directions. The attachment 32 is formed with a latch 32c that is brought into engagement with a hook 46 of battery pack 41 to restrict movement of the battery pack 41 along the guide rails 32b, 32b.

The rear end housing 31 has a pair of legs 33 formed at its front bottom. The legs 33 are useful to space the rear end housing 31 and battery packs 41 from the ground in a condition where the frame rod 11 was placed on a horizontal surface S of the ground.

The battery packs 41 are used as the source of power supply for the motor 22 and recharged by a charger (not shown). The battery packs each are adapted to be used as a source of power supply for power tools such as a power driver, a power cutter, or the like. In this embodiment, the nominal voltage of each battery pack is 18V. The two battery packs 41, 41 are connected in series.

Figure 7:
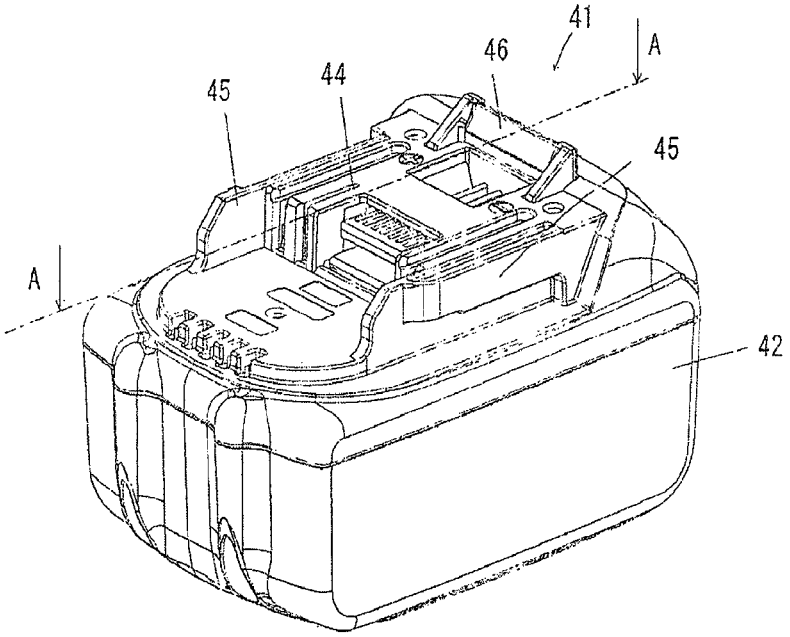
FIG. 7 is a perspective view of a battery pack.
Figure 8:
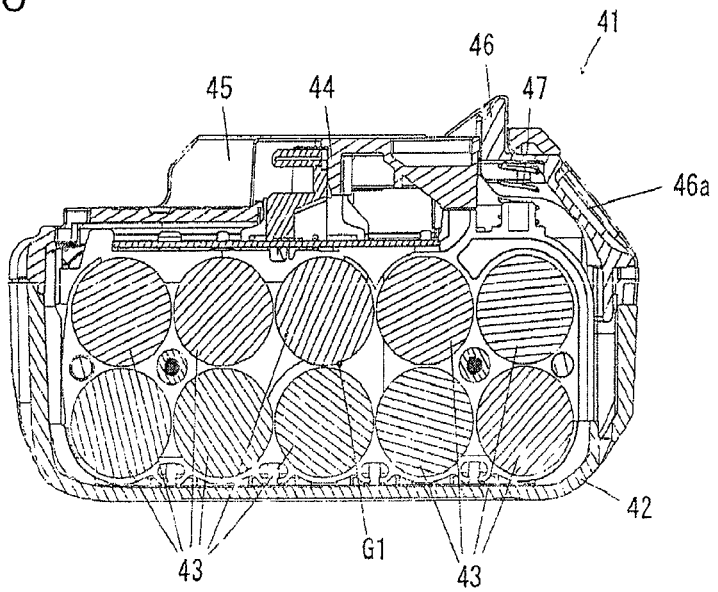
FIG. 8 is a cross-sectional view taken along line A-A in FIG. 7.

As shown in FIGS. 7 and 8, the battery pack 41 is in the form of a rectangular parallelepiped casing 42 containing ten pieces of cylindrical battery cells 43. The casing 42 of battery pack 41 is coupled with the attachment 32 by slide movement, and the battery cells 43 are contained in the casing 42 perpendicularly. The center of casing 42 is located to be the center of gravity of battery packs 41.

As shown in FIG. 7, the casing 42 has an upper wall to be faced to the attachment 32. The electric connector 44 is provided on the upper wall of the casing 42 to be detachably coupled with the connector 32a of attachment 32 within the rear end housing 31. A pair of rails 45, 45 are formed on the upper wall of casing 42 and arranged at both sides of electric connector 44 in a direction perpendicularly across the longitudinal direction of casing 42. The hook 46 is provided on the upper wall of casing 42 and protruded toward the attachment 32. The hook 46 is loaded by a resilient member 47 toward the latch portion 32c of attachment 32. When the hook 46 is maintained in engagement with the latch portion 32c, the battery packs 41 are retained in place on the guide rails 32b, 32b to couple the connector 44 with the connector 32a of attachment 32a. When a release button 46a is pushed against the biasing force of resilient member 47 to retract the hook 46 from the latch portion 32c, the battery pack 41 can be removed along the guide rails 32b, 32b to disengage the connector 44 of battery pack 41 from the connector 32a of attachment 32.

As shown in FIGS. 1 and 2, a cover member 51 is provided on the front end of frame rod 11 to enclose the cutting blade 25 of cutter unit 20. A handle 52 fixed to an intermediate portion of frame rod 11 extends in left-and-right hand directions and is bent upward. The handle 52 is provided at its opposite ends with grips 53, 53 to be grasped by a user.

When the electric motor 22 of cutter unit 20 in the brush cutter 10 is activated by power supplied from the two batteries 41, 41, the rotary support shaft 24 is driven by the output shaft 22a of motor 22 through the speed reduction gear 23 in engagement therewith to rotate the cutting blade 25 fixed thereto. Thus, the user grasps both the grips 53, 53 by left-and-right hands and brings the cutting blade 25 of cutter unit into contact with vegetation such as brush, grass, lawn and the like to cut out them.

Figure 9:
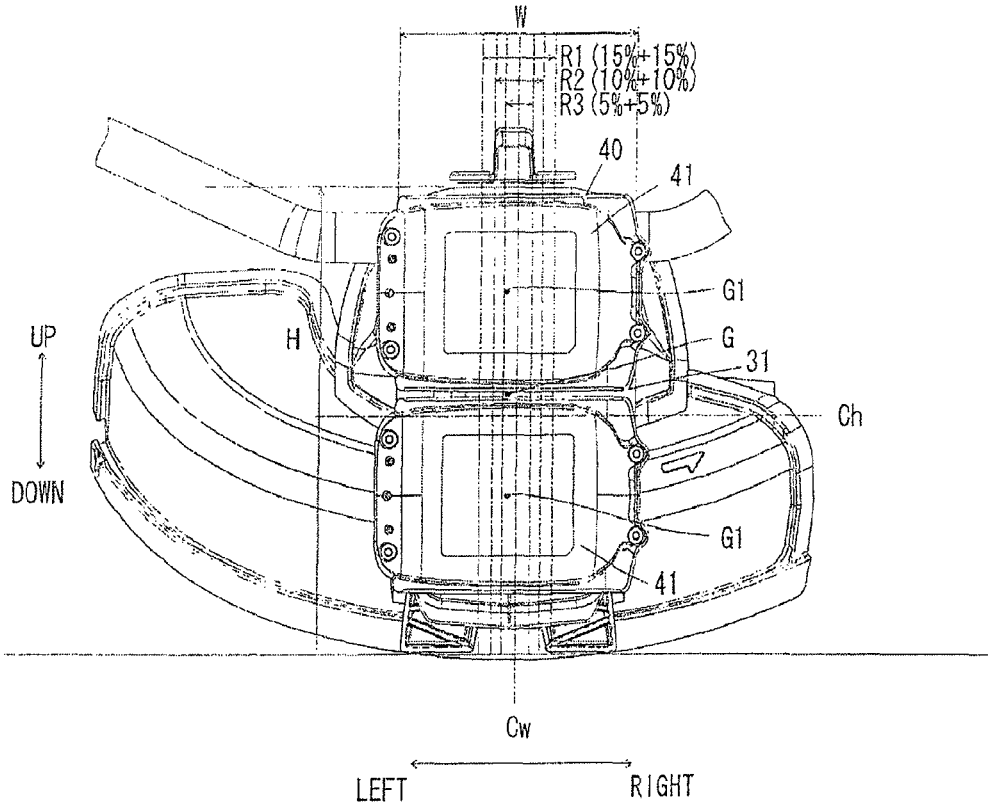
FIG. 9 depicts a center of gravity of the brush cutter observed from the rear side.

In the brush cutter 10, two rechargeable battery packs 41, 41 used for electric power tools are adapted as a source of power supply 40 for the electric motor 22. Accordingly, it is not needed for a user to hold various kinds of battery packs for the brush cutter, electric power tools and the like. The operability of the brush cutter and the mounting operation of the battery packs are greatly affected by mounting positions of the battery packs. Thus, as shown in FIG. 9, the battery packs 41, 41 are arranged in such a manner that the center of gravity G of the brush cutter observed from the rear side in a condition wherein the frame rod 11 was placed on a horizontal support place S is positioned in an extent R(R1) of 15% of lateral width W of the rear end housing 31 at both the left and right sides of a centerline Cw extending vertically from the rear end housing 31. With such arrangement of the two battery packs 41, 41, it is able to prevent lateral inclination of the brush cutter 10. In the case that the center of gravity G of the brush cutter 10 observed from the rear side is positioned in an extent R2 of 10% of lateral width W of the rear housing 31 at both the left and right sides of the vertical centerline Cw, lateral inclination of the brush cutter 10 is reliably prevented.

When the center of gravity G of the brush cutter is positioned an extent (R3) of 5% of lateral width of the rear housing 31, it is able to more reliably prevent lateral inclination of the brush cutter 10. With such arrangement of the center of gravity G of the brush cutter 10, it becomes unnecessary for a user to firmly grasp the grips 53, 53 of handle 52 in operation of the brush cutter 10.

In this embodiment, the center of gravity G is displaced laterally (left or right) from the vertical centerline Cw in the extent R described above. With such arrangement of the center of gravity G, the brush cutter 10 is slightly inclined in a lateral direction such that the rotary blade 25 is slightly inclined to be in contact with grass, lawn and the like. This facilitates operation of the brush cutter 10. In the brush cutter, each center of gravity G1, G1 of the battery packs 41, 41 is positioned in the extent R to prevent lateral inclination of the brush cutter 10 in operation.

When the frame rod 11 is placed on a horizontal support place S in use of the brush cutter 10, the battery packs 41, 41 are spaced from a surface of ground to avoid damage caused by contact with the ground.

In the brush cutter 10, the two battery packs 41, 41 are arranged in parallel to facilitate operation of a user for attachment or removal of the battery packs. In the case that the size of battery pack 41 is 540 $cm^3$ more than 200 $cm^3$, it is preferable that the space between the battery packs arranged in parallel is determined to be less than 15 mm for reducing the space occupied by the battery packs.

In the brush cutter 10, the rear end housing 31 is provided at its rear portion with two attachments 32, 32 for mounting the two battery packs 41, 41. Each casing 42 of the battery cells 43 is provided at its peripheral wall with the electric connector 44, and the pair of rails 45, 45 arranged both sides of the connector 44, while the attachments 32 each is provided with the pair of guide rails 32b, 32b to be engaged with the rails 45 of casing 42. When the battery pack 41 is mounted to the attachment 32, the pair of rails 45, 45 of battery back 4 are brought into slide engagement with the guide rails 32b, 32b.

The battery pack 41 has a hook 46 retractably projected, while the attachment 32 is provided with a latch portion 32c to be engaged with the hook 46. When the hook 46 of battery pack 41 is brought into engagement with the latch portion 32c, the battery pack is fixed in place to the attachment 32.

Hereinafter, modifications of the brush cutter using a set of two battery packs will be described.

Figure 10A:
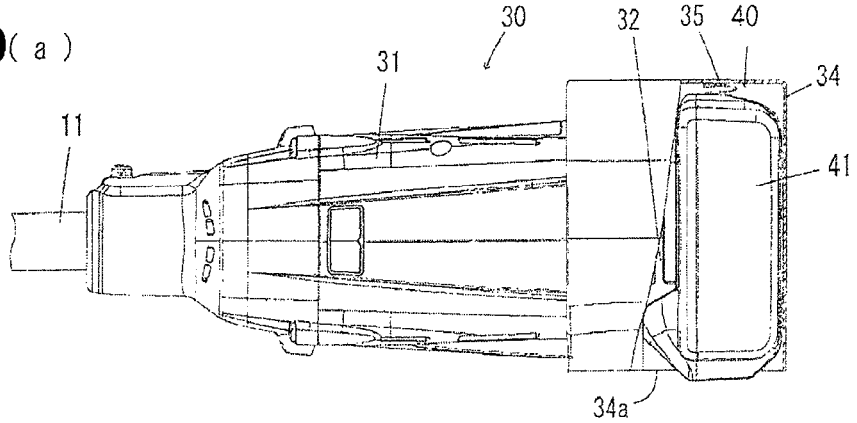
FIGS. 10 (a) and 10 (b) are a partly broken sectional view showing a battery pack contained in a battery pack container in a modification 1, where FIG. 10 (a) is a sectional view in a condition where the battery pack is contained, where FIG. 10 (b) is a sectional view in a condition where the battery pack was pushed out from an insert opening under a biasing force of a resilient member.
Figure 10B:
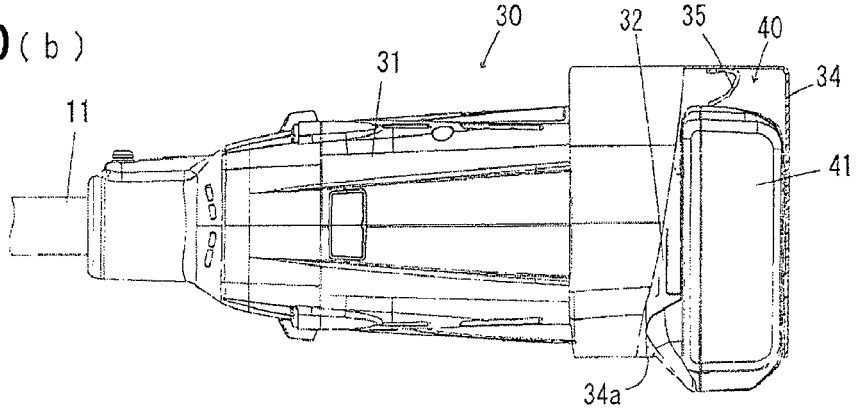

Modification 1:

In a modification 1 of the brush cutter shown in FIG. 10, the attachment 32 within the rear end housing 31 is provided with a container 34 enclosing the periphery of battery packs 41, 41 to prevent adherence of contaminants thereto. The battery pack container 34 is formed at its one side wall with an insert opening 34a for the battery packs 41. When the battery packs 41, 41 each are inserted into the container 34 through the opening 34a and shifted inward along the guide rails 32b, 32b, the hook 46 is engaged with the latch portion 32c of attachment 32 to retain the battery packs 41 in place.

The attachment 32 is provided with a resilient member 35 biasing outward the battery packs 41 inserted in the container 34. When it is desired to take out the battery packs, the release button 46a is pushed to disengage the hook 46 from the latch portion 32c. Thus, as shown in FIG. 10, the battery packs 41, 41 are moved outward through the insert opening 34a under the biasing force of resilient member 35 and taken out by a user from the container portion 34.

Figure 11:
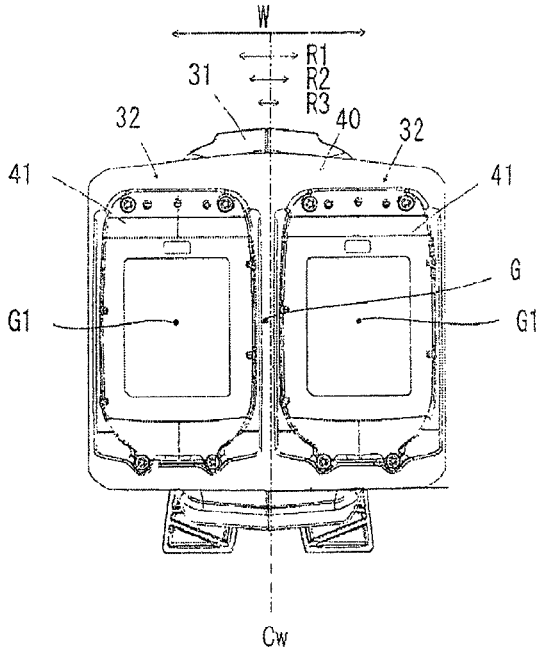
FIG. 11 is a back view of a controller unit in a modification 2.

Modification 2:

As shown in FIG. 11, the battery packs 41, 41 may be arranged vertically in parallel on the back portion of rear end housing 31. In this modification, the two attachments 32, 32 are provided laterally in parallel on the back portion of rear end housing 31, and the pair of guide rails 32b, 32b is provided vertically at the both sides of each connector 32a of attachments 32, 32. Thus, the battery packs 41, 41 are mounted in place by downward slide movement along the guide rails 32b, 32b With such arrangement of the battery packs, each center of gravity G1 is positioned at left and right sides of the vertical centerline Cw to ensure balance of the brush cutter in a left-and-right direction. In this modification 2, the battery pack container 34 and resilient member 35 may be provided as in the modification 1.

Figure 12:
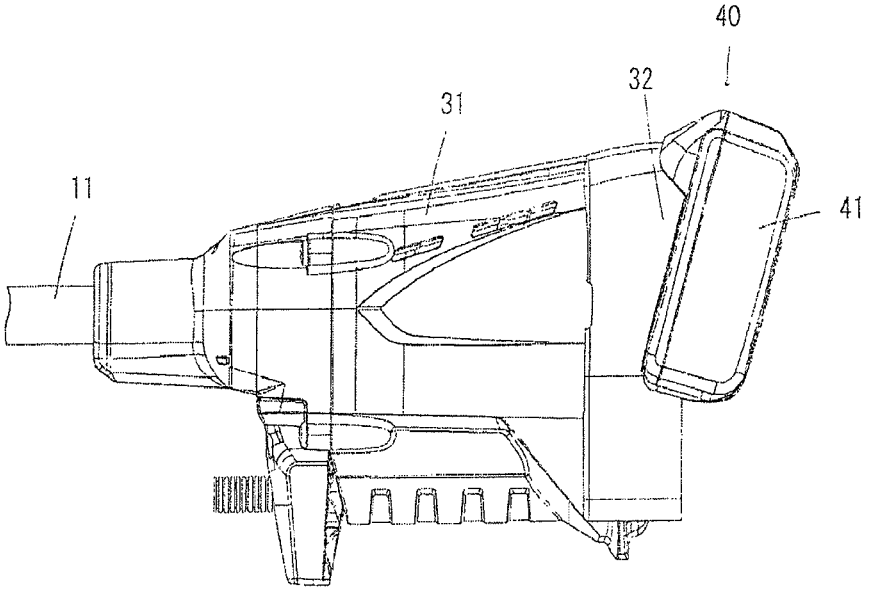
FIG. 12 is a side view of a controller unit in a modification 3.

Modification 3:

As shown in FIG. 12, the battery packs 41, 41 arranged as in the modification 1 may be inclined backward at their upper sides. In this modification, the attachment portions 32 and guide rails 32b, 32b are inclined backward at their upper sides.

With such arrangement of the battery packs, the battery packs 41, 41 can be mounted in place by downward pushing and removed by bringing upward. In this modification 3, the battery pack container 34 and resilient member 35 may be provided as in the modification 1.

Figure 13A:
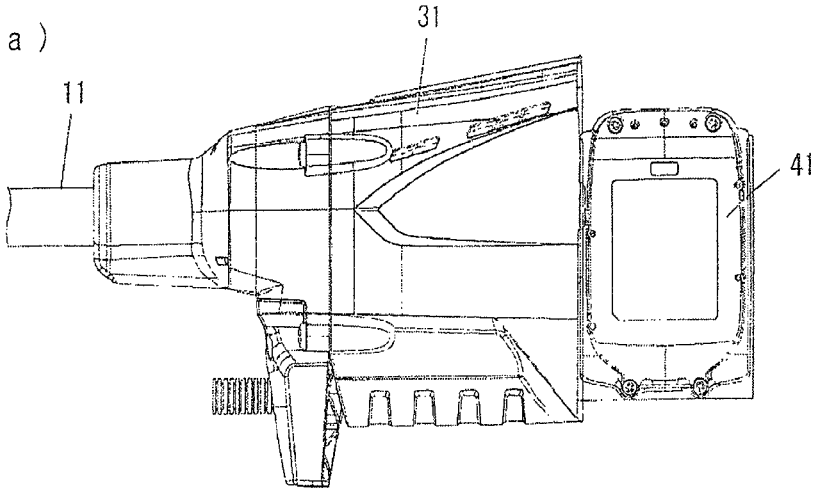
FIGS. 13 (a) and 13 (b) depict a controller unit in a modification 4, where FIG. 13 (a) is a side view of the controller unit, and wherein FIG. 13 (b) is a back view of the controller unit.
Figure 13B:
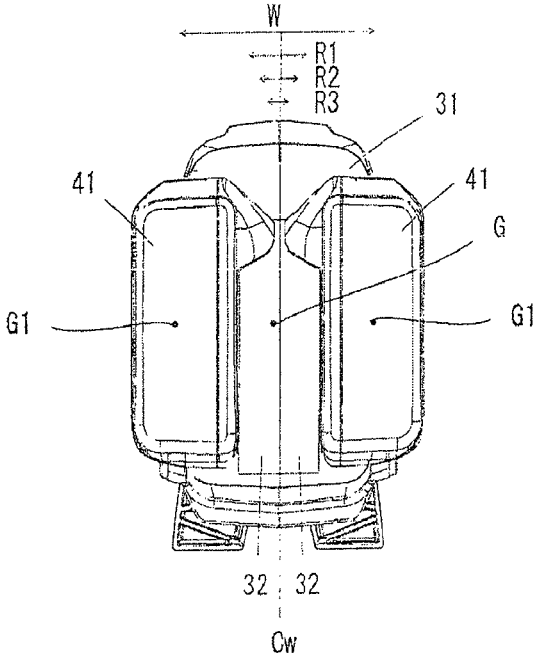

Modification 4:

As shown in FIGS. 13(a) and (b), the battery packs 41, 41 may be arranged vertically in parallel on the back portion of rear end housing 31 in such a manner that the mounting sides of battery packs 41, 41 to the attachment 32 are faced to each other. In the attachments 32, 32, each connector 32a and each pair of guide rails 32b are directed outward.

With such arrangement of the battery packs, the same useful effect is obtainable as in the modification 2. In this modification 4, the battery pack container 34 and resilient member 35 may be provided as in the modification 1.

Figure 14:
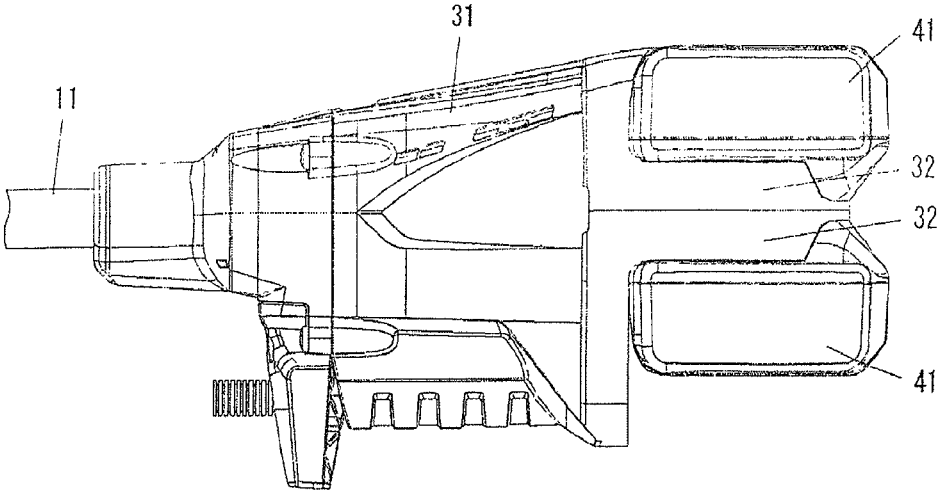
FIG. 14 is a side view of a controller unit shown in the modification 5.

Modification 5:

As shown in FIG. 14, the battery packs 41, 41 may be arranged vertically in parallel on the back portion of rear end housing 31 in such a manner that the mounting sides of battery packs 41, 41 to the attachment 32 are faced to each other in a vertical direction. In the attachments 32, 32, the connector 32a and guide rails 32b of the upper attachment 32 are directed downward, while the connected 32a and guide rails 32b of the lower attachment are directed upward. Thus, the battery packs 41, 41 are mounted to the attachments by slide movement along the guide rails. The two battery packs 41, 41 are positioned at a central portion of the rear end housing 31 in a left-and-right direction.

With such arrangement of the battery packs 41, 41, the same useful effect as in the foregoing modifications is obtainable. The battery pack container 34 and resilient member 35 may be provided as in the modification 1.

Figure 15:
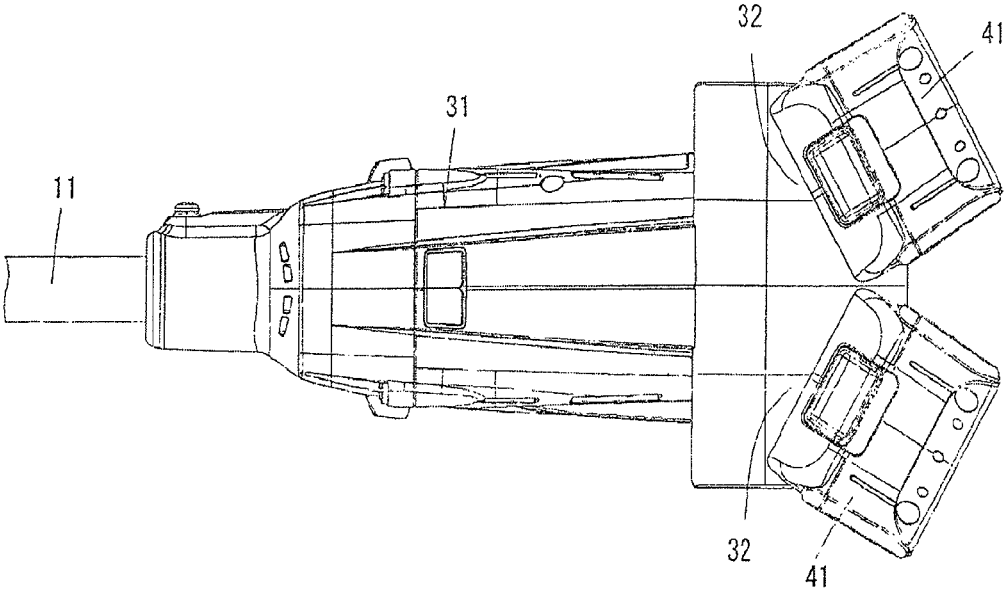
FIG. 15 is a plan view of a controller unit shown in the modification 6.

Modification 6:

As shown in FIG. 15, the battery packs 41, 41 are mounted on the rear portion of rear end housing 31 in such a manner that the opposed wall surfaces of battery packs 41, 41 are widely spaced at their rear portions.

With such arrangement of the battery packs 41, 41, the space between the opposed walls surfaces can be determined more than 15 mm to facilitate removal of the battery packs. Thus, the operability for detachment of the battery packs is improved. The same useful effect as in the modification 2 is obtainable. In this modification 6, the battery pack container 34 and resilient member 35 may be provided as in the modification 1.

Figure 16:
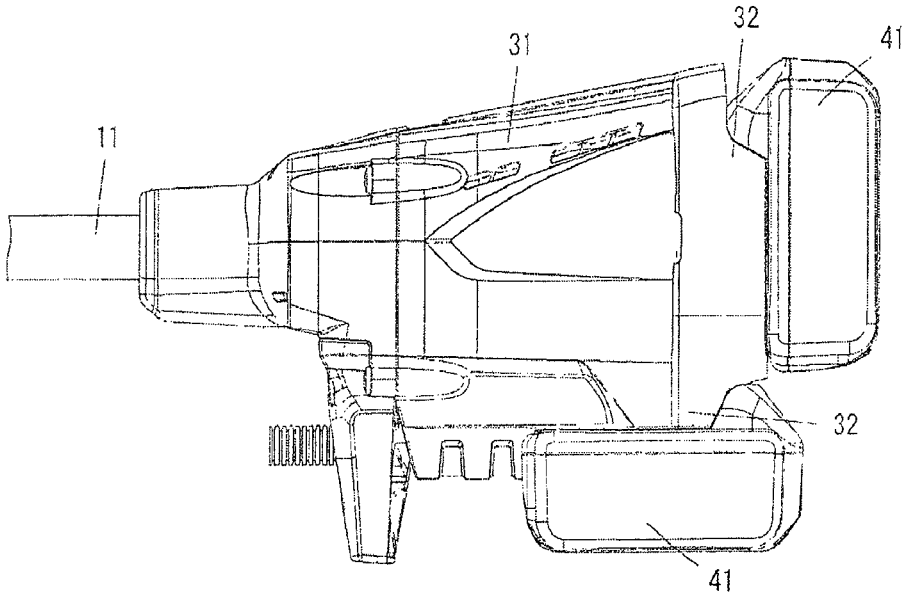
FIG. 16 is a side view of a controller unit shown in the modification 7 (1)
Figure 17:
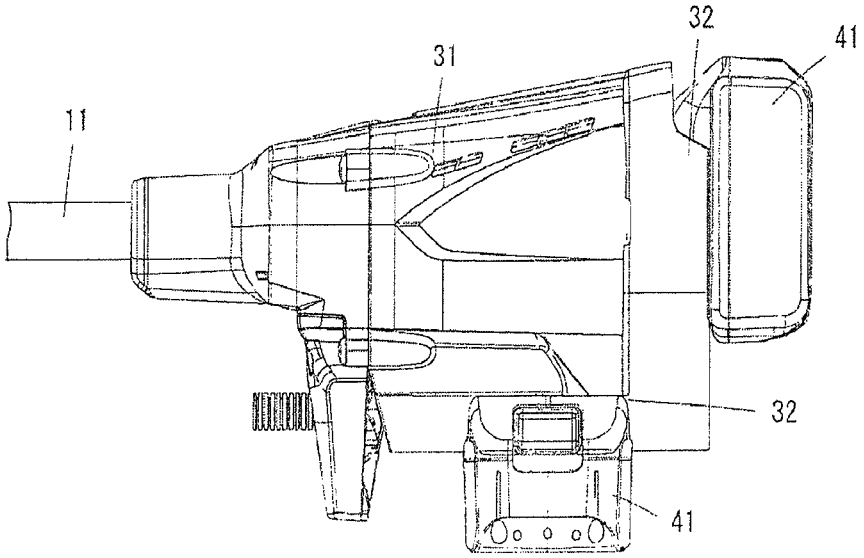
FIG. 17 is a side view of a controller unit shown in the modification 7 (2)

Modification 7:

As shown in FIG. 16, one of the battery packs 41 is vertically mounted to the back portion of rear end housing 31, while the other battery pack 41 is horizontally mounted to the bottom portion of rear end housing 31. The former battery pack 41 is mounted in place by downward slide movement, while the latter battery pack 41 is mounted in place by forward movement. The two battery packs 41 are placed at a central portion in a left-and-right direction of rear end housing 31. The former battery pack 41 may be arranged to be mounted by slide movement in a left-and-right direction. The latter battery pack 41 may be arranged to be mounted also by slide movement in the left-and-right direction.

With such arrangement of the battery packs 41, 41, the same useful effect as in the foregoing modifications is obtainable. The battery pack container 34 and resilient member 35 may be provided as in the modification 1.

Figure 18:
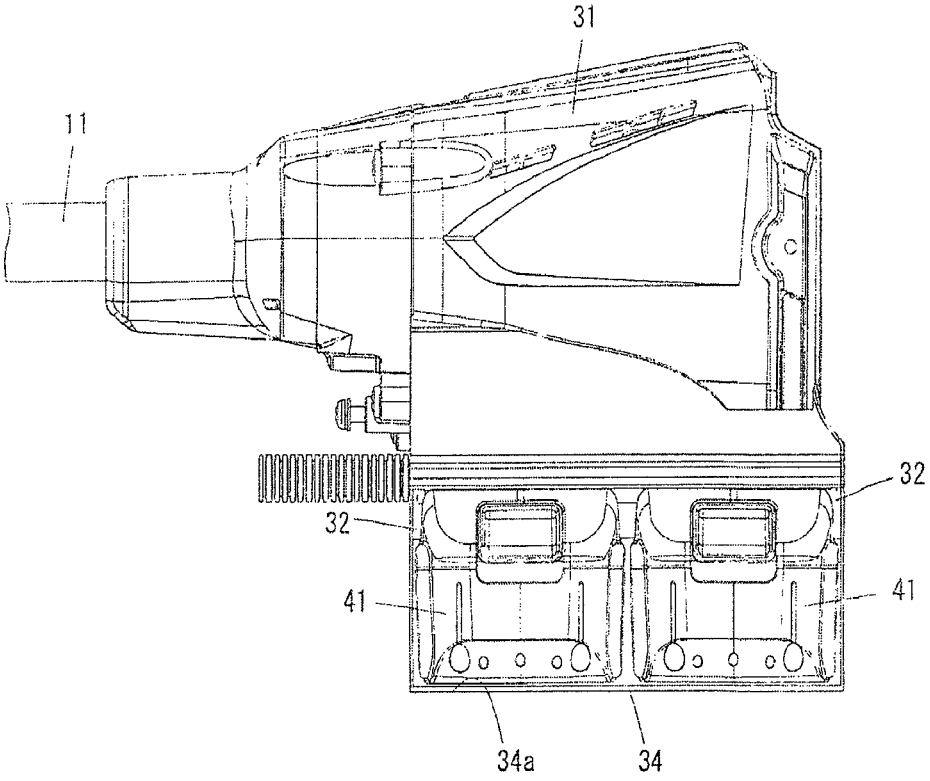
FIG. 18 is a side view of a controller unit shown in the modification 8.

Modification 8:

As shown in FIG. 18, the battery packs 41, 41 may be mounted in parallel to the bottom portion of rear end housing 31. The two attachments 32, 32 are provided in parallel within the bottom portion of rear end housing 31. The guide rails 32b, 32 extending in a left-and-right direction are provided at both sides of the connector 32a of each attachment 32. Thus, the battery packs 41, 41 are mounted in place by rightward slide movement along the guide rails 32. Thus, the two battery packs 41, 41 are placed at a central portion of the left-and-right direction.

In this modification, the rear end housing 31 is provided with a battery pack container 34 enclosing the periphery of battery packs 41 as in the modification 1. As described above, the container 34 is useful to prevent adherence of contaminant and to cover a portion of the battery packs exposed to ground when the frame rod 11 of the brush cutter is placed on the support surface S. The container 34 is also useful to prevent damage of the battery packs caused by impact. In this modification 8, the battery pack container 34 and resilient member 35 may be provided as in the modification 1.

With such arrangement of the battery packs 41, 41, the center of gravity G of the brush cutter observed from the back side in a condition where the frame rod was placed on a horizontal support surface is positioned under a centerline Ch extending laterally at height H in a vertical direction to adjust the balance of the brush cutter in a left-and-right direction and prevent inclination of the brush cutter in the left-and-right direction.

Modification 9:

As shown in FIG. 19, the battery packs 41, 41 are mounted in parallel to the bottom of rear end housing 31 in a left-and-right direction, and the two attachments 32, 32 are mounted in parallel to the bottom of rear end housing 31. The pair of guide rails 32b, 32 extends in a fore-and-aft direction at the both sides of each connector 32a of the attachments 32. Thus, the battery packs 41, 41 are mounted in place by forward slide movement along the guide rails 32b, 32b.

With such arrangement of the battery packs 41, the center of gravity G of the brush cutter observed from the back side in a condition where the frame rod was placed on a horizontal support surface is positioned under a centerline Ch extending laterally at height H in a vertical direction to adjust the balance of the brush cutter in a left-and-right direction and to prevent inclination of the brush cutter in a left-and-right direction. Thus, the same useful effect as in the modification 2 is obtainable. In this modification 9, the battery pack container 34 and resilient member 35 may be provided as in the modification.

Figure 20A:
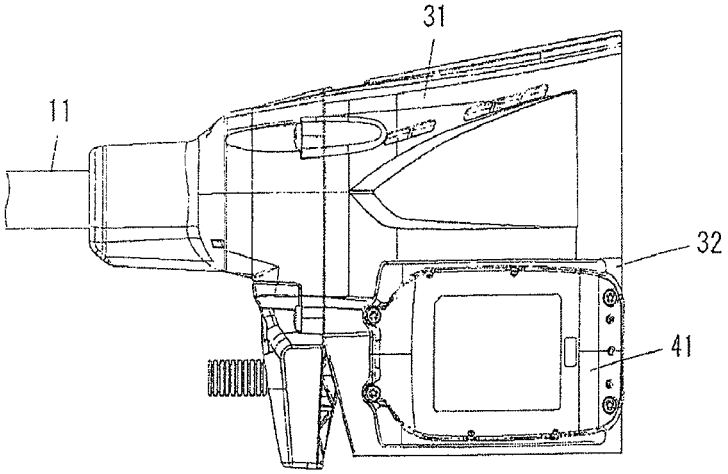
FIG. 20 (a) is a side-view of a controller unit shown in the modification 10, and FIG. 20 (b) is a back view of the controller unit.
Figure 20B:
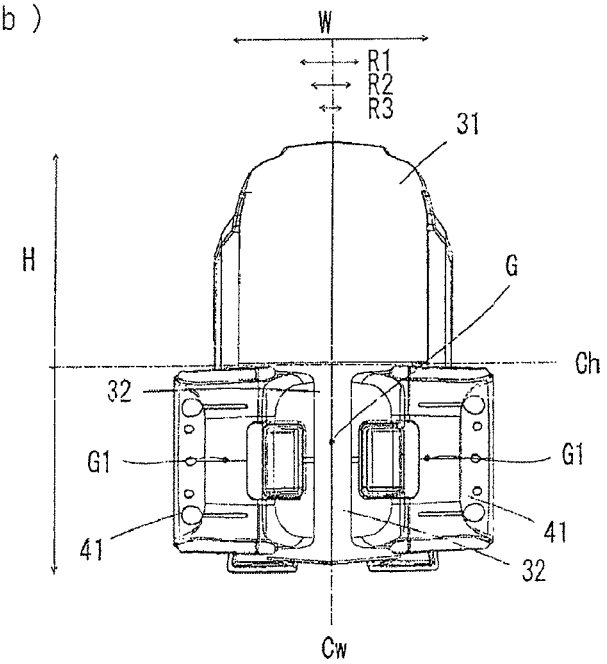

Modification 10:

As shown in FIG. 20, the battery packs 41, 41 are mounted in parallel to a bottom portion of rear end housing 31 in such a manner that the mounting sides of battery packs 41 to the attachment 32 are faced to each other. The two attachments 32, 32 are mounted in parallel to the bottom portion of rear end housing 31 in a left-and-right direction. The pair of guide rails 32b, 32b extending in a fore-and-aft direction is provided at the both sides of each connector 32a of the attachments 32. Thus, the battery packs 41, 41 are mounted in place by forward slide movement along the guide rails 32b, 32b.

With such arrangement of the battery packs 41, 41, the center of gravity G of the brush cutter observed from the back side in a condition where the frame rod was placed on a horizontal support surface is positioned under a centerline Ch extending laterally at height H in a vertical direction to adjust the balance of the brush cutter in a left-and-right direction and prevent inclination of the brush cutter in the left-and-right direction. The same useful effect as in the modification 2 is obtainable. In this modification 10, the battery pack container 34 and resilient member 35 may be provided as in the modification 1.

Figure 21A:
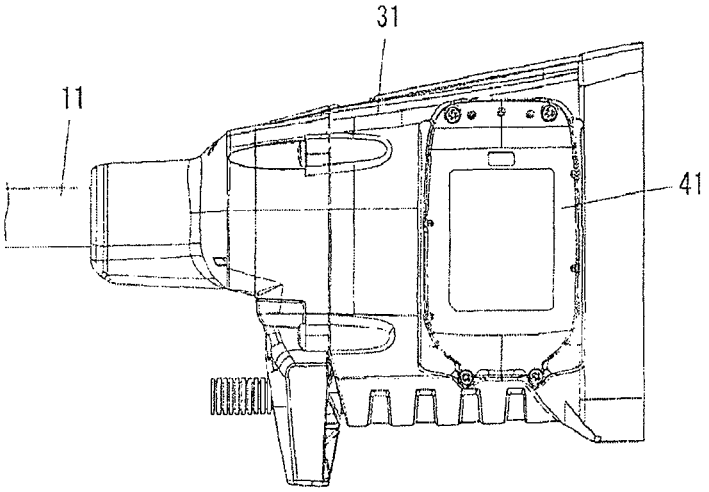
FIG. 21 (a) is a side view of a controller unit shown in the modification 11, and FIG. 21 (b) is a back view of the controller unit.
Figure 21B:
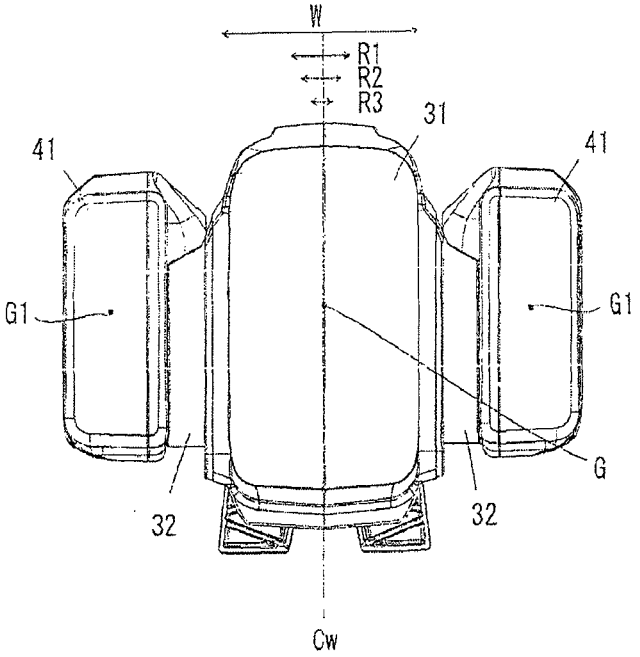

Modification 11:

As shown in FIG. 21, the battery packs 41, 41 may be mounted to the opposite sides of rear end housing 31 in such a manner that the mounting sides of battery packs 41 to the attachments 32 are opposed to each other. The attachments 32 of battery packs 41 are vertically mounted to the both sides of rear end housing 31, and the pair of guide rails 32b, 32b is provided vertically at the both sides of each connector 32a of attachments 32. Thus, the battery packs 41, 41 are mounted in place by downward slide movement along the guide rails 32b, 32b.

With such arrangement of the battery packs 41, 41, each center of gravity G1 of the battery packs 41 is positioned at the both sides of a vertical centerline Cw to adjust balance of the brush cutter in a left-and-right direction. In this modification 11, the battery pack container 34 and resilient member 35 may be provided as in the modification 1.

Figure 22:
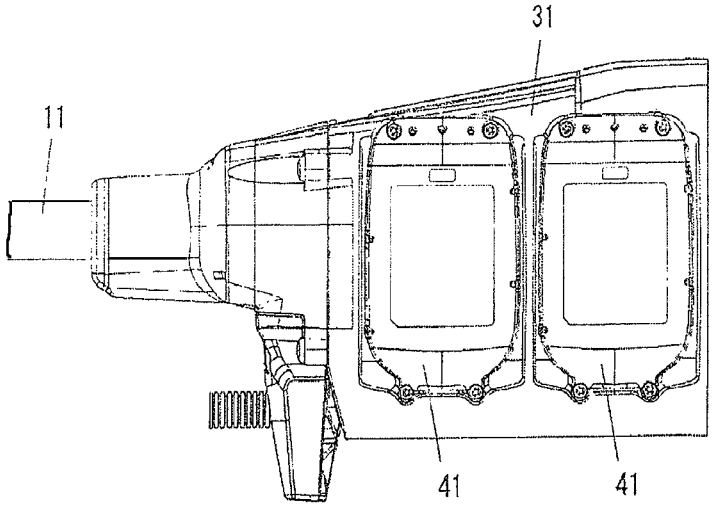
FIG. 22 is a side view of a controller unit in the modification 12.

Modification 12:

As shown in FIG. 22, the battery packs 41, 41 may be mounted in parallel to the left side of rear end housing 31. The attachments 32, 32 of battery packs 41, 41 are mounted vertically to the left side of rear end housing 31. The pair of guide rails 32b, 32b is provided vertically at the both side of each connector 32a of the attachments 32. Thus, the battery packs 41, 41 are mounted in place by downward slide movement along the guide rails 32b, 32b.

Modification 13:

As shown in FIGS. 23(a) and (b), the battery packs 41, 41 may be mounted in parallel on the upper portion of rear end housing 31. The attachments 32, 32 of battery packs 41, 41 are also mounted in parallel on the upper portion of rear end housing 31. The pair of guide rails 32b, 32b is provided in a fore-and-aft direction at the both sides of each connector 32a of attachments 32. Thus, the battery packs 41, 41 are mounted in place by forward slide movement along the guide rails 32b.

In such arrangement of the battery packs 41, 41, each center of gravity G1 of battery packs 41, 41 is positioned at the both sides of vertical center line Cw to adjust balance of the brush cutter in a left-and-right direction. The same useful effect as in the modification 2 is obtainable. In this modification 13, the battery pack container 34 and resilient member 35 may be provided as in the modification 1.

Figure 24:
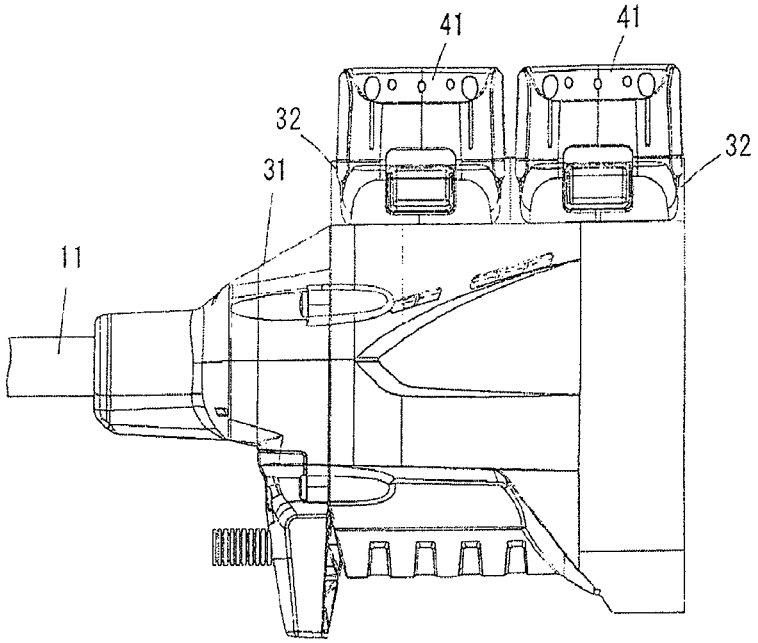
FIG. 24 is a side-view of a controller unit in the modification 13.

Modification 14:

As shown in FIG. 24, the battery packs 41, 41 may be mounted in parallel in a fore-and-aft direction on the upper portion of rear end housing 31. The two attachments 32, 32 are also mounted in parallel in a fore-and-aft direction on the rear end housing 31. The pair of guide rails 32b, 32b is provided at the both sides of each connector 32a of attachments. Thus, the battery packs 41, 41 are mounted in place by rightward slide movement along the guide rails 32b, 32b.

With such arrangement of the battery packs 41, 41, the same useful effect as in the foregoing modifications is obtainable. The battery pack container 34 and resilient member 35 may be provided as in the modification 1.

Figure 25:
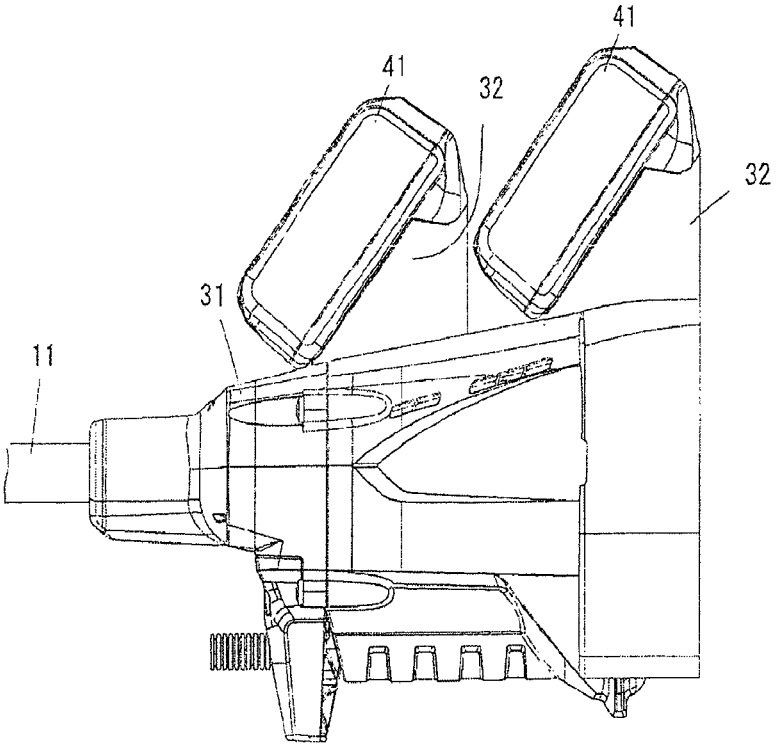
FIG. 25 is a side view of a controller unit in the modification 14.

Modification 15:

As shown in FIG. 25, the battery packs 41, 41 may be mounted in parallel in a fore-and-aft direction on the upper portion of rear end housing 31 in such a manner that the battery packs are raised at their rear portions to be inclined forward. In this modification, the front and rear attachments 32, 32 and guide rails 32b, 32b are also mounted in parallel on the upper portion of rear end housing 31 in such a manner that the attachments 32, 32 are raised at their rear portions to be inclined forward.

With such arrangement of the battery packs 41, 41, the same useful effect as in the foregoing modifications is obtainable. In this modification 15, the battery pack container 34 and resilient member 35 may be provided at in the modification 1.

Although in the brush cutter 10 described above, the two battery packs 41, 41 are electrically connected in series with the electric motor 22 for supply of high power, the two battery packs 41, 41 may be electrically connected in parallel with the electric motor 22 for supply of power for a long period of time. A control circuit may be provided to select the series connection or the parallel connection to the electric motor 22.

Although the handle 52 of the law trimmer 10 is in the form of U-letter shape observed from the backside, the handle may be in the form of a loop-handle connected to an intermediate portion of the frame rod 11. Similarly, the handle may be replaced with a grip larger in thickness that the frame rod 11.

Although in the brush cutter 10, the two battery packs 41, 41 are mounted to the rear end housing 31, the two battery packs 41, 41 may be mounted to the frame rod 11 or the front end housing 21. Alternatively, the battery pack 41 may be mounted to the front end housing 21 and the rear end housing 31, respectively. In the case that the battery packs 41 are mounted to the frame rod 11, it is preferable in operability that the battery packs are mounted under the handle 52.

Further, in the case that a plurality of battery packs is connected in series, it is preferable to provide a battery controller for controlling each voltage of the battery packs. In the case that a battery controller and a motor controller are united to reduce the number of component parts, the occupation space and required wiring, the same microcomputer may be adapted to control operation of the electric motor and voltage of the battery packs 41.

Figure 26:
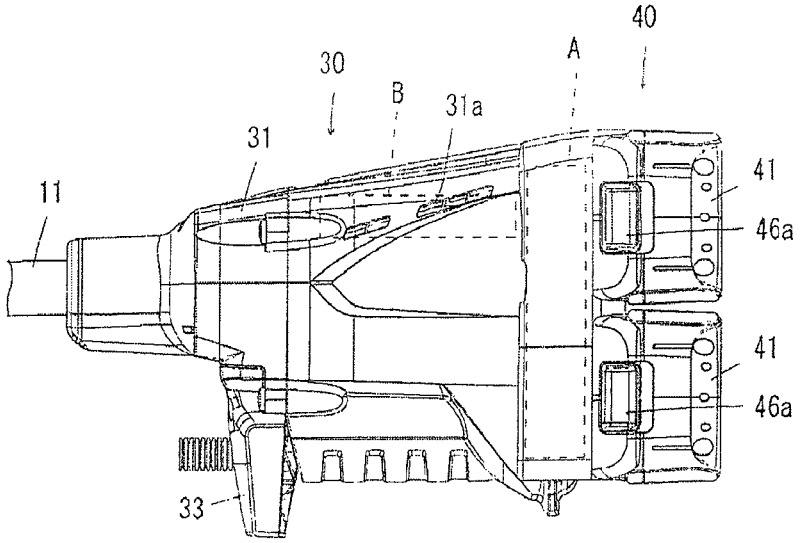
FIG. 26 is a side view of a controller unit showing the position of a battery controller.

As shown in FIG. 26, it is preferable to provide the battery controller (united with or separated from the motor controller) in a position A adjacent the mounting position of the battery packs 41 thereby to shorten the wiring to the battery packs. In the case that the battery controller (united with or separated from the motor controller) is provided in a position B adjacent an air suction opening 31a, the battery controller is cooled by the outside air. The battery controller may be provided in a passage of air caused by operation of a cooling fan driven by the electric motor 22 within the front end housing 21. In such a case, the battery controller is provided in a passage communicating the air suction opening 31a of rear end housing 31 with the cooling fan through the frame rod 11 or a passage of air discharged from the front end housing 21 in operation of the cooling fan.

Although in the brush cutter 10, the electric motor 22 is mounted within the front end housing 21, the electric motor 22 may be mounted within the rear end housing 31 and connected to the rotary cutter 25 through a driving shaft disposed in the frame rod 11.

In the case that the two battery packs 41, 41 in the brush cutter 10 are connected in series, the electric motor 22 would not be activated if one of the battery packs was damaged or fully discharged. It is, therefore, preferable to provide an indicator of remaining power of each battery pack 41. The indicator is in the form of an indication panel 60 indicating an amount of remaining power or charge of each battery pack by plural bars. It is preferable that the indication panel

60 is positioned to be visually recognized by a user when the battery packs 41 are mounted in place. In the case that as shown in FIG. 27(a), the battery packs 41, 41 are mounted vertically in parallel to the back portion of rear end housing 31, the indication panels 60, 60 are mounted to the left side wall of rear end housing 31. In the case that as shown in FIG. 27(b), the battery packs 41, 41 are mounted in parallel in a fore-and-aft direction on the upper portion of rear end housing 31, the indication panels 60, 60 are mounted to the left side or upper wall of rear end housing 31 in a fore-and-aft direction. With such arrangement of the indication panels 60, 60, the remaining power or charge of the battery packs 41, 41 indicated on the panels 60, 60 can be visually confirmed at once by a user.

What is claimed is:

1. A brush cutter, comprising:

a frame rod;

a front end housing fixed to a front end of the frame rod;

a cutting blade mounted on a support shaft within the front end housing for rotation;

a rear end housing fixed to a rear end of the frame [rode] *rod*;

an electric motor mounted within the rear end housing for rotating the cutting blade; and a source of power supply for the electric motor, wherein the source of power supply is a plurality of rechargeable battery packs adapted for use in electric power tools, and a position of a center of gravity of the brush cutter, when observed from a back side of the brush cutter in a condition where the frame rod is placed on a horizontal support surface, is offset a distance from one of a left side or a right side of a centerline extending vertically from the rear end housing within a width range between 5%-15% of a width of the rear end housing.

2. The brush cutter as claimed in claim 1, wherein a center of gravity of each of the plurality of rechargeable battery packs is positioned within the width range.

3. [A] *The* brush cutter[, comprising:] *as claimed in claim 1, wherein*

[a frame rod;

a front end housing fixed to a front end of the frame rod;

a cutting blade mounted on a support shaft within the front end housing for rotation;

a rear end housing fixed to a rear end of the frame rode;

an electric motor mounted within the rear end housing for rotating the cutting blade; and a source of power supply for the electric motor, wherein the source of power supply is a plurality of rechargeable battery packs adapted for use in electric power tools,]

the plurality of rechargeable battery packs is two battery packs arranged in parallel, and a center of gravity of [each] *one* of the two battery packs is positioned at [one of] a left side [or a right side] of a centerline extending vertically from the rear end housing when observed from a back side of the rear end housing, *and a center of gravity of the other of the two battery packs is positioned at a right side of the centerline when observed from the back side of the rear end housing*.

4. [A] *The* brush cutter[, comprising:] *as claimed in claim 3, wherein*

[a frame rod;

a front end housing fixed to a front end of the frame rod;

a cutting blade mounted on a support shaft within the front end housing for rotation;

a rear end housing fixed to a rear end of the frame rode;

an electric motor mounted within the rear end housing for rotating the cutting blade; and a source of power supply for the electric motor, wherein the source of power supply is a plurality of rechargeable battery packs adapted for use in electric power tools, and the plurality of rechargeable] *the two* battery packs are positioned to avoid contact with [ground] *a horizontal support surface* in a condition where the [frame rod] *brush cutter* is placed on [a] *the* horizontal support surface.

5. The brush cutter as claimed in claim 1, wherein a protector member is provided to cover surfaces of the plurality of rechargeable battery packs being brought into contact with the [ground] *horizontal support surface* when the [frame rod] *brush cutter* is placed on [a] *the* horizontal support surface.

6. A brush cutter, comprising:

a frame rod;

a front end housing fixed to a front end of the frame rod;

a cutting blade mounted on a support shaft within the front end housing for rotation;

a rear end housing fixed to a rear end of the frame [rode] *rod*;

an electric motor mounted within the rear end housing for rotating the cutting blade; and a source of power supply for the electric motor, wherein the source of power supply is a plurality of rechargeable battery packs adapted for use in electric power tools, the plurality of the rechargeable battery packs are arranged in parallel,

[a space between adjacent wall surfaces of the plurality of rechargeable battery packs arranged in parallel is more than 15 mm, and]

a size of each of the plurality of rechargeable battery packs is more than 200 $cm^3$, and [the] *a* space between adjacent wall surfaces of the plurality of rechargeable battery packs is less than 15 mm.

7. The brush cutter as claimed in claim 1, wherein a plurality of attachments for mounting the plurality of rechargeable battery packs are provided within the rear end housing of the brush cutter.

8. The brush cutter as claimed in claim 7, wherein the plurality of rechargeable battery packs each include a casing formed to contain battery cells, an electric connector provided on a peripheral wall of the casing, and a pair of rails arranged at both sides of the electric connector, and the plurality of attachments are each provided with a pair of guide rails engageable with the pair of rails of said casing.

9. The brush cutter as claimed in claim 8, wherein the plurality of rechargeable battery packs are each provided with a hook retractably projected to be engaged with a latch respectively provided on the plurality of attachments, and the plurality of rechargeable battery packs are mounted in place on the plurality of attachments when the hook of each battery pack is engaged with the latch of each attachment by a slide movement of the pair of rails of the plurality of rechargeable battery packs engaged with the pair of guide rails on the plurality of attachments.

10. The brush cutter as claimed in claim 9, wherein each attachment is provided with a resilient member to bias outwardly each battery pack mounted to each attachment.

11. The brush cutter as claimed in claim 10, wherein each attachment is provided with a container enclosing each of the plurality of rechargeable battery packs and having an insert opening for inserting each of the plurality of rechargeable battery packs therein along the pair of guide rails.

12. The brush cutter as claimed in claim 1, wherein the plurality of rechargeable battery packs are connected in series with the electric motor.

13. The brush cutter as claimed in claim 1, wherein the plurality of rechargeable battery packs are connected in parallel with the electric motor.

14. A brush cutter, comprising:

a frame rod;

a front end housing fixed to a front end of the frame rod;

a cutting blade mounted on a support shaft within the front end housing for rotation;

a rear end housing fixed to a rear end of the frame [rode] *rod*;

an electric motor mounted within the rear end housing for rotating the cutting blade; and a source of power supply for the electric motor, wherein the source of power supply is a plurality of rechargeable battery packs adapted for use in electric power tools, the plurality of rechargeable battery packs are detachably mounted to the rear end housing, and a center gravity of the brush cutter, when observed from a back side of the brush cutter in a condition where the frame rod is placed on a horizontal support surface, is positioned under a centerline extending in a lateral direction of the rear end housing.

*15. A brush cutter, comprising:*

*a frame rod;*

*a front end housing fixed to a front end of the frame rod;*

*a cutting blade mounted on a support shaft within the front end housing for rotation;*

*a rear end housing fixed to a rear end of the frame rod;*

*an electric motor mounted within one of the front end housing or the rear end housing for rotating the cutting blade; and*

*a source of power supply for the electric motor, wherein*

*the source of power supply is a plurality of rechargeable battery packs adapted for use in electric power tools, and*

*a position of a center of gravity of the brush cutter, when observed from a back side of the brush cutter in a condition where the frame rod is placed on a horizontal support surface, is offset a distance from one of a left side or a right side of a centerline extending vertically from the rear end housing within a width range between 5%-15% of a width of the rear end housing.*

*16. The brush cutter as claimed in claim 15, wherein*

*a center of gravity of each of the plurality of rechargeable battery packs is positioned within the width range.*

*17. The brush cutter as claimed in claim 15, wherein*

*the plurality of rechargeable packs is two battery packs arranged in parallel, and*

*a center of gravity of one of the two battery packs is positioned at a left side of a centerline extending vertically from the rear end housing when observed from a back side of the rear end housing, and a center of gravity of the other of two battery packs is positioned at a right side of the centerline when observed from the back side of the rear end housing.*

*18. The brush cutter as claimed in claim 17, wherein*

*the two battery packs are positioned to avoid contact with a horizontal support surface in a condition where the frame rod is placed on the horizontal support surface.*

*19. The brush cutter as claimed in claim 15, wherein*

*a protector member is provided to cover surfaces of the plurality of rechargeable battery packs being brought into contact with the horizontal support surface when the brush cutter is placed on the horizontal support surface.*

*20. The brush cutter as claimed in claim 15, wherein*

*a plurality of attachments for mounting the plurality of rechargeable battery packs are provided within the rear end housing of the brush cutter.*

*21. The brush cutter as claimed in claim 20, wherein*

*the plurality of rechargeable battery packs each include a casing formed to contain battery cells, an electric connector provided on a peripheral wall of the casing, and a pair of rails arranged at both sides of the electric connector, and*

*the plurality of attachments are each provided with a pair of guide rails engageable with the pair of rails of said casing.*

*22. The brush cutter as claimed in claim 21, wherein*

*the plurality of rechargeable battery packs are each provided with a hook retractably projected to be engaged with a latch respectively provided on the plurality of attachments, and*

*the plurality of rechargeable battery packs are mounted in place on the plurality of attachments when the hook of each battery pack is engaged with the latch of each attachment by a slide movement of the pair of rails of the plurality of rechargeable battery packs engaged with the pair of guide rails on the plurality of attachments.*

*23. The brush cutter as claimed in claim 22, wherein*

*each attachment is provided with a resilient member to bias outwardly each battery pack mounted to each attachment.*

*24. The brush cutter as claimed in claim 23, wherein*

*each attachment is provided with a container enclosing each of the plurality of rechargeable battery packs and having an insert opening for inserting each of the plurality of rechargeable battery packs therein along the pair of guide rails.*

*25. The brush cutter as claimed in claim 15, wherein*

*the plurality of rechargeable battery packs are connected in series with the electric motor.*

*26. The brush cutter as claimed in claim 15, wherein*

*the plurality of rechargeable battery packs are connected in parallel with the electric motor.*

*27. A brush cutter, comprising:*

*a frame rod;*

*a front end housing fixed to a front end of the frame rod;*

*a cutting blade mounted on a support shaft within the front end housing for rotation;*

*a rear end housing fixed to a rear end of the frame rod;*

*an electric motor mounted within one of the front end housing or the rear end housing for rotating the cutting blade; and*

*a source of power supply for the electric motor, wherein the source of power supply is a plurality of rechargeable battery packs adapted for use in electric power tools,*

*the plurality of the rechargeable battery packs are arranged in parallel,*

*a size of each of the plurality of rechargeable battery packs is more than 200 $cm^3$, and*

*a space between adjacent wall surfaces of the plurality of rechargeable battery packs is less than 15 mm.*

*28. A brush cutter, comprising:*

*a frame rod;*

*a front end housing fixed to a front end of the frame rod;*

*a cutting blade mounted on a support shaft within the front end housing for rotation;*

*a rear end housing fixed to a rear end of the frame rod;*

*an electric motor mounted within one of the front end housing or the rear end housing for rotating the cutting blade; and*

*a source of power supply for the electric motor, wherein the source of power supply is a plurality of rechargeable battery packs adapted for use in electric power tools,*

*the plurality of rechargeable battery packs are detachably mounted to the rear end housing, and*

*a center gravity of the brush cutter, when observed from a back side of the brush cutter in a condition where the frame rod is placed on a horizontal support surface, is positioned under a centerline extending in a lateral direction of the rear end housing.*

* * * * *